United States Patent [19]

Frank et al.

[11] Patent Number: 5,405,266

[45] Date of Patent: Apr. 11, 1995

[54] THERAPY METHOD USING PSYCHOTHERAPEUTIC DOLL

[75] Inventors: Barbara L. Frank, 6315 Campbell Rd., No. 308-C, Dallas, Tex. 75248; Richard N. Neiman, Dallas, Tex.

[73] Assignee: Barbara L. Frank, Dallas, Tex.

[21] Appl. No.: 930,800

[22] Filed: Aug. 17, 1992

[51] Int. Cl.6 .............................. G09B 19/00
[52] U.S. Cl. ................... 434/237; 434/236; 446/321; 446/337
[58] Field of Search ............... 434/236, 237; 446/321, 446/337, 338, 339, 341, 369, 390, 268; 132/319

[56] References Cited

U.S. PATENT DOCUMENTS

| | | | |
|---|---|---|---|
| D. 83,218 | 2/1931 | Seror | 446/369 X |
| D. 275,693 | 9/1984 | Gregory | D21/166 |
| D. 279,727 | 7/1985 | Mitchell | D2/343 |
| D. 282,189 | 1/1986 | Williams et al. | 446/369 X |
| 1,435,267 | 11/1922 | Vathe | 446/369 |
| 1,923,340 | 8/1933 | Steckler | 132/319 X |
| 3,789,547 | 2/1974 | Chemarin | 446/158 |
| 4,020,586 | 5/1977 | Benner | 446/164 |
| 4,244,142 | 1/1981 | Crawford | 434/262 X |
| 4,296,567 | 10/1981 | Kamar | 446/163 |
| 4,341,521 | 7/1982 | Solomon | 434/236 |
| 4,373,329 | 2/1983 | Pelura | 446/153 |
| 4,423,834 | 1/1984 | Rush | 224/151 |
| 4,540,378 | 9/1985 | Cusimano | 446/369 |
| 4,573,927 | 3/1986 | Newman | 434/236 |
| 4,762,494 | 8/1988 | Woods | 434/236 |
| 4,776,823 | 10/1988 | Hanlon | 446/321 |
| 4,917,607 | 4/1990 | Van Hoose | 434/236 |
| 4,968,281 | 11/1990 | Smith | 446/390 X |
| 5,027,457 | 7/1991 | Sweet | 5/437 |
| 5,044,959 | 9/1991 | Shaver et al. | 434/236 |
| 5,094,621 | 3/1992 | Friedal | 434/236 |

FOREIGN PATENT DOCUMENTS

| | | | |
|---|---|---|---|
| 2559676 | 8/1985 | France | 446/321 |
| 2013508 | 8/1979 | United Kingdom | 446/321 |
| 2239814 | 7/1991 | United Kingdom | 446/147 |

OTHER PUBLICATIONS

Freud, *An Outline of Psychoanalysis*, (Norton, 1949), pp. 38-39, 44-45, 50-51.
Freud, *The Interpretation of Dreams* (Avon, 1965), pp. 42-43, 46-47, 50-51, 98-101, 112-113, 650-653.
Mitchell, "Father of The Child Within," *Time* (Nov. 25, 1991) pp. 82-83.

*Primary Examiner*—Gene Mancene
*Assistant Examiner*—Jeffrey A. Smith
*Attorney, Agent, or Firm*—Vinson & Elkins

[57] ABSTRACT

A psychotherapeutic doll comprising a substantially featureless soft body and head, and with disproportionately long arms and legs, is disclosed. The patient is provided with a plurality of face elements, each attachable to the head of the doll by way of an elastic band, so that the patient can express emotional states at a selected age in his life. Multiple face elements may be simultaneously attached to the head portion to convey and portray one emotional state hidden by another. The doll preferably includes a backpack with a transparent pocket, to allow the patient to indicate the age currently being projected onto the doll; multiple pockets can allow for multiple ages to be indicated, thus providing the patient with the ability to convey an emotional history.

13 Claims, 5 Drawing Sheets

THERAPY METHOD USING PSYCHOTHERAPEUTIC DOLL

This invention is in the field of psychotherapy, and is more specifically directed to an expressive tool useful in the same.

BACKGROUND OF THE INVENTION

In the field of psychotherapy, both in individual or group settings, the ease with which the patient expresses her emotions is of great importance. If the patient has difficulty in expressing her current and past emotions, whether due to the her reluctance to express these emotions or due to a physical or psychological handicap in doing so, diagnostic and therapeutic progress will be quite slow. In addition, if the medium of expression itself presents barriers to the patient in communicating emotions, the patient's expressions may be misinterpreted by the therapist, resulting in misdiagnosis or less effective treatment. Accordingly, many therapists utilize psychotherapeutic tools to improve their patients' ability to accurately convey their emotions.

By way of background, U.S. Pat. No. 4,762,494, issued to Woods, discloses a doll useful in the psychotherapy of children. The doll has a face with expressionless eyes and a nose, and with VELCRO patches located above and below the eyes, at the location of the mouth, near the heart, and elsewhere, at which the patient may attach specific emotional indicia, such as tears, eyebrows, a smile or frown, a cloud, a color patch, and a solid or broken heart, according to the emotions felt by the patient. The doll also includes arms with VELCRO patches on the hands, permitting a hugging or embracing configuration (see column 5, lines 63 through 66). The Woods reference further discloses that the doll may be used to communicate present or past mental states (see column 5, line 25).

U.S. Pat. No. 4,573,927, issued to Newman, also discloses a doll useful in the child psychotherapy and child care contexts. This doll has a hood overlapping the face area of the doll's head, into which a circular facial panel may be inserted and retained; the facial panels have four specific facial expressions (happy, sad, angry, afraid), allowing the patient to express their thoughts and feelings by selecting the appropriate face. This reference discloses that the dolls are preferably gender specific (boy dolls for boys, girl dolls for girls). The reference further discloses that the doll may be used by an adult to communicate positive reinforcement to the child (see column 3, lines 38 through 44).

U.S. Pat. No. 4,917,607, issued Apr. 17, 1990 to Van Hoose, discloses a doll for facilitating communication of emotions in a therapy context. This doll has a face and other ornamentation, and further includes cavities for receiving fabric forms indicative of human feelings, as well as forms representing body parts and attributes. Placement of the various forms into the cavities is disclosed as effecting communication from patient to therapist.

U.S. Pat. No. 4,373,292, issued Feb. 15, 1983 to Pelura, discloses a doll having dual faces indicative of various predetermined roles, such as doctor/nurse, mother/father, boy/girl, etc., and which can be connected together in a role playing context.

Each of these prior psychotherapeutic tools include representational features (such as presenting gender and age information), as well as decorative features. Accordingly, these dolls will tend to bias the patient's expression of emotions in a therapy situation, limiting his ability to express particular emotions. In addition, these prior tools are limited in their expression of hidden emotions or states, as each are capable of a single expression at a particular time. Furthermore, no provision is provided in these dolls for presenting any sort of time-dependent information regarding the patient's emotional history.

By way of further background in the field of toys, U.S. Pat. No. 5,044,959, issued to Shaver et. al., discloses a stuffed animal or doll having a frontal opening into which a child patient may place objects indicative of their emotions and their intensity, and having an openable rear plate through which the therapist can view the objects placed into the figure by the patient. The objects include face disks with varied expressions.

U.S. Pat. No. 4,423,834, issued to Rush, discloses a backpack for a doll, such as a stuffed bear. The backpack may fold down to serve as a cape.

U.S. Pat. No. 5,027,457, issued to Sweet, discloses a pillow having extended arms which can wrap around a person's neck to hold onto the person while the person moves around. The Sweet reference discloses that VELCRO fasteners may be used on the mitts of the hands of this pillow.

U.S. Pat. No. 1,435,267, issued to Vathe, discloses a doll having disproportionately long (i.e., "grotesque") arms and legs.

U.S. Pat. No. 4,020,586, issued to Benner, discloses a doll having an envelope over the face area into which a photograph of the face of a child may be placed to personalize the doll.

U.S. Pat. No. D-275,693, issued to Gregory, discloses a doll having disproportionately long arms and VELCRO fasteners at the hand location. U.S. Pat. No. 3,789,547, issued to Chemarin, discloses the construction and use of VELCRO fasteners on a child's toy. Other references, namely U.S. Pat. No. D-279,727 (Mitchell), No. 4,296,567 (Kamar), and No. 4,540,378 (Cusimano), each disclose dolls and wraps having positionable arms.

By way of further background, a psychotherapy technique has been recently popularized in which the patient recalls and expresses emotions corresponding to various stages of their childhood and adolescence, i.e., the "inner child" or the "child within". While recently popularized, this psychotherapeutic concept has been known for many years. See, e.g., Freud, *The Interpretation of Dreams;* Freud, *An Outline of Psychoanalysis.* According to this approach, patients express, for example by acting out, emotions that they experienced at specific ages, in order to allow the adult patient to resolve anxieties that originated in childhood.

By way of further background, U.S. Pat. No. 4,341,521 discloses a psychotherapeutic device useful for child patients, and consisting of a role-playing book with various pages depicting dramatic schemes. The child expresses emotions by placing one of a series of puppets into the scene as a character, according to the child's belief as to the emotion felt by the character.

It is therefore an object of the present invention to provide a psychotherapeutic tool in the form of a doll, which allows for a patient to express a wide range of emotions, attitudes, defensive processes and the like that correspond to her self-image at particular ages in her development, including the present, and in a manner that is independent of verbalization.

It is a further object of the present invention to provide such a tool that represents a particular "child within" or "inner child", and provide a tangible tool that enables a patient to be "in touch" with his "inner child-like self".

It is a further object of the present invention to provide such a tool which has minimal representational bias, allowing the patient to freely express his emotional states.

It is a further object of the present invention to provide such a tool which allows for expression of a history of self-images.

It is a further object of the present invention to provide such a tool which allows for the use of multiple layered expressions to indicate outwardly apparent emotions that are masking true, inner emotions.

It is a further object of the present invention to provide such a tool which provides comfort to the patient during a therapy session.

Other objects and advantages of the present invention will be apparent to those of ordinary skill in the art having reference to the following specification together with the drawings.

SUMMARY OF THE INVENTION

The invention may be incorporated into a psychotherapeutic doll which is substantially featureless and expressionless, thus allowing the patient to freely express particular emotions currently or previously experienced. A group of facial expressions are provided on disks which are secured to the head of the doll by an elastic band; multiple face elements may be attached at any one time, indicating the hiding of particular emotional states. The doll has elongated arms which may be fastened around the patient's neck to provide a sense of unity between the patient and doll, as well as a sense of comfort to the patient. A backpack may also be provided into which indicators of emotions over time may be placed to express the current age of the projected self-image, and alternatively an emotional history of the patient.

DETAILED DESCRIPTION OF THE PREFERRED EMBODIMENT

Figure 1A:
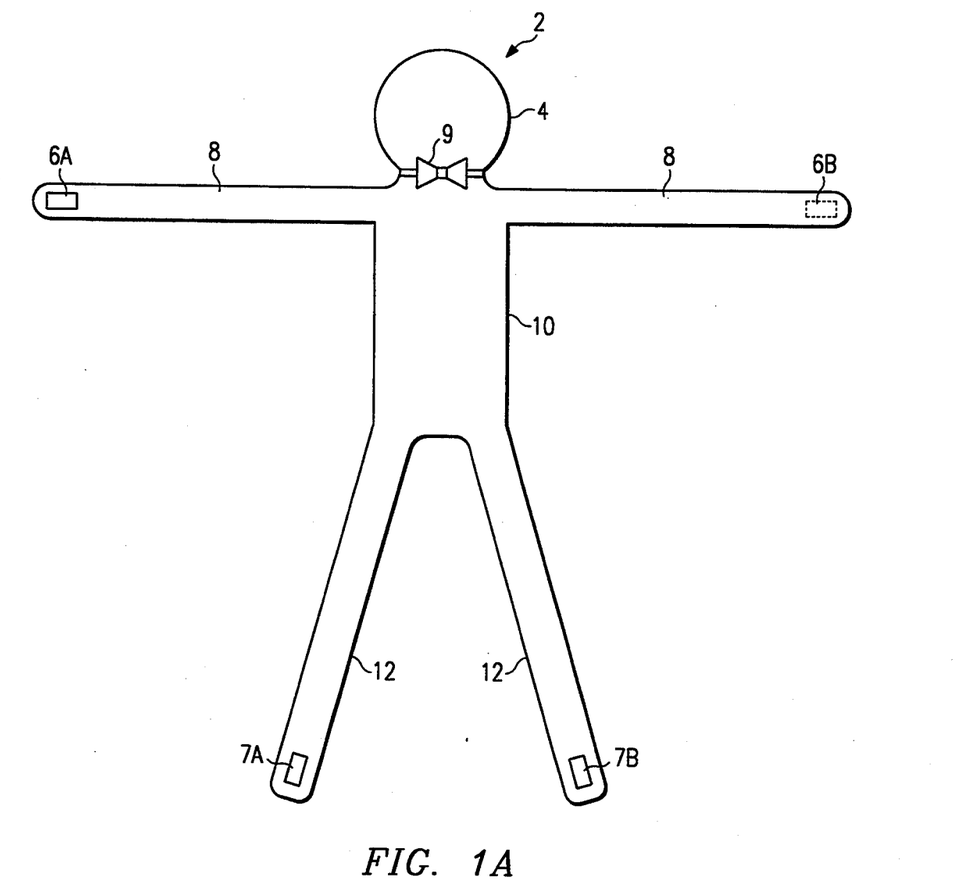
FIGS. 1a through 1c are various elevation views of a psychotherapeutic doll according to the preferred embodiment of the invention.
Figure 1B:
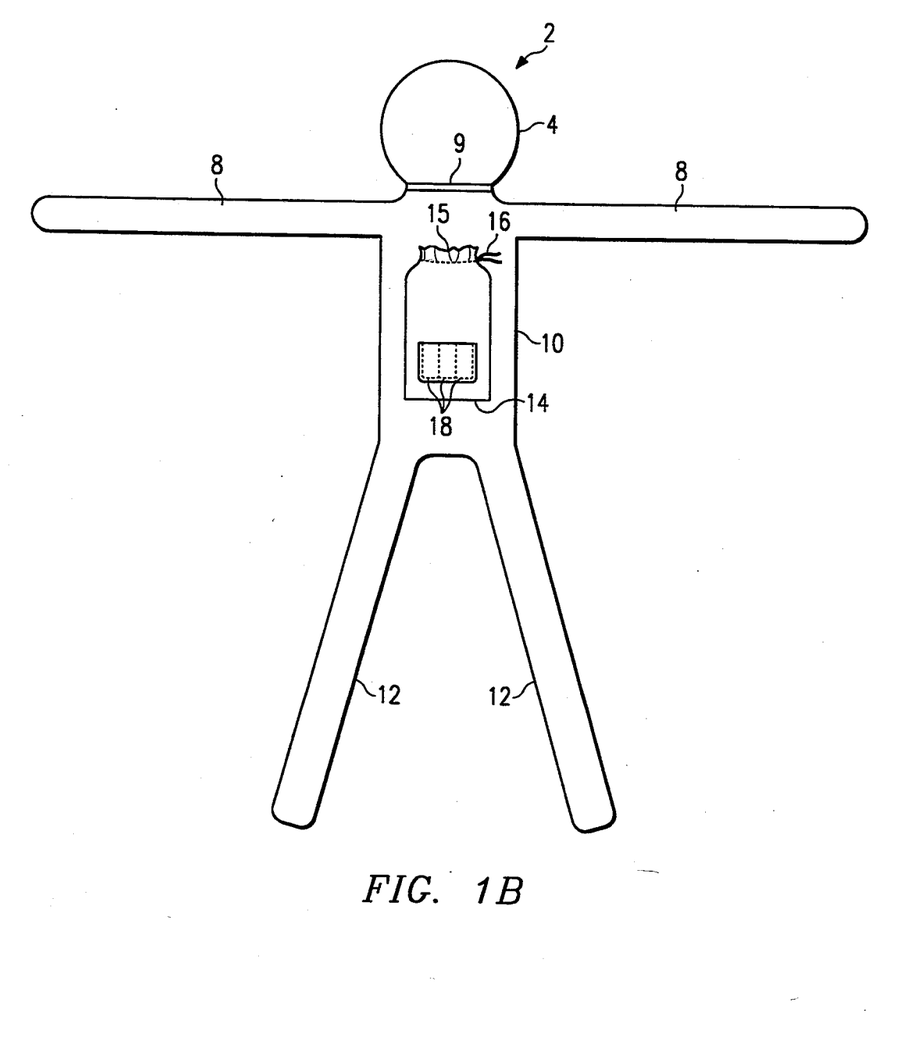
Figure 1C:
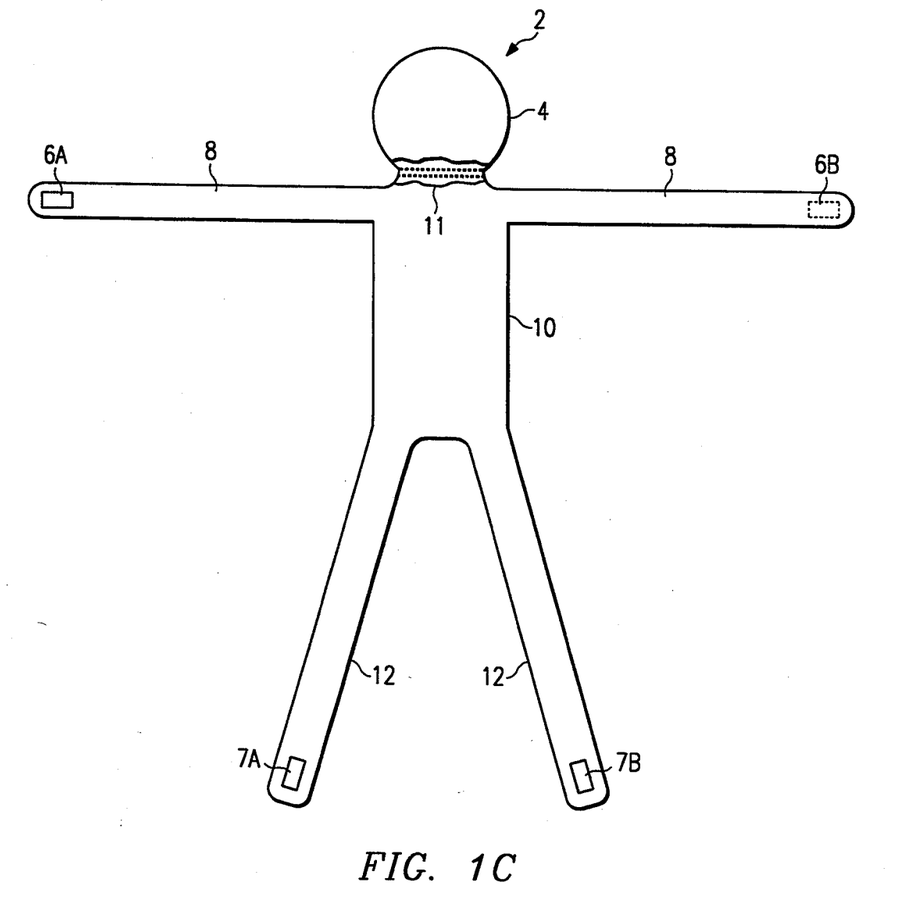

Referring first to FIGS. 1a through 1c, the construction of doll 2 according to the preferred embodiment of the invention, and useful in a psychotherapeutic context, will now be described in detail. Doll 2 is of substantially a human shape, and as such includes body section 10 with head 4 disposed at the top thereof when held upright. According to the preferred embodiment of the invention, body section 10 is approximately twelve to fifteen inches in height, and is cylindrical in shape. Head section 4 preferably has a circular face, and has an elliptical cross-section (in plan view, not shown), so that its thickness is less than its width. Body section 10 and head section 4 are preferably loosely stuffed with cotton or other conventional stuffing fiber, to provide a soft feel to the patient using doll 2.

Elongated arms 8 and legs 12 extend from body section 10, and are disproportionately long (e.g., on the order of two feet). The length of arms 8 and legs 12 should be sufficient to hug a seated patient; to maintain the hugging position, opposing arms 8 have hooks 6A and fur 6B to form a conventional fastener of the VELCRO type. Arms 8 and legs 12 are also preferably loosely stuffed so as to be limp and flexible, rather than stiff. Legs 12 may also be equipped with VELCRO type fasteners, by way of hooks 7A and fur 7B at their distal ends from body 10, to maintain legs 12 also in a hugging position about the patient.

For purposes of minimizing any representational bias to a patient in psychotherapy using doll 2, no face is provided on head section 4, nor are any other features illustrated or conveyed elsewhere on doll 2. In addition, the exterior of doll 2, including body 10, head 4, arms 8 and legs 12 is preferably of a substantially colorless fabric. For example, muslin fabric having its "natural" off-white color is preferred; this color and type of fabric also enables the patient to draw emotional information or other indicia on doll 2. Gender identification may be suggested by way of bow tie 9 (FIG. 1a) for a male doll, or lace collar 11 (FIG. 1c) for a female doll; bow tie 9 and collar 11 are preferably removably fastenable to doll 2, for example by way of VELCRO type fasteners or the like. It is believed that this substantial lack of features and colors will be beneficial in allowing patients in psychotherapy to freely and spontaneously project their emotions onto doll 2, thus assisting the therapist both in arriving at a diagnosis and also in providing therapy.

Referring now to the rear view of doll 2 illustrated in FIG. 1b, attached to the back side of body portion 10, indicated by the orientation of VELCRO fasteners 6A, 6B on arms 8, is backpack 14. Backpack 14 may be fixedly attached to body portion 10 (e.g., sewn), or may be removably attached thereto by way of conventional backpack straps or the like. According to this embodiment of the invention, backpack 14 has an open top 15, closable by way of drawstring 16, allowing items such as face elements 20 (described hereinbelow), printed material on cards, and other patient-selected items to be stored therein. Backpack 14 further includes multiple pockets 18 on its outer surface, formed of a transparent material such as flexible plastic, and having open tops. As will be described in further detail hereinbelow, multiple pockets 18 will be useful for conveying historical or temporal information, such as an indication of the age of the self-image currently expressed by the patient via doll 2, or an emotional history of the patient.

Figure 2A:
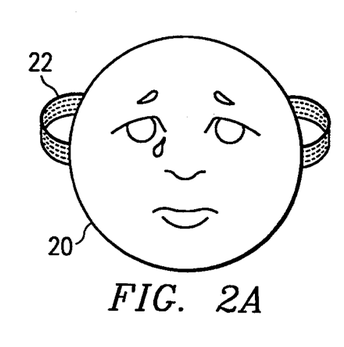
FIGS. 2a and 2b are front and rear views, respectively, of a face element in the preferred embodiment of the invention.
Figure 2B:
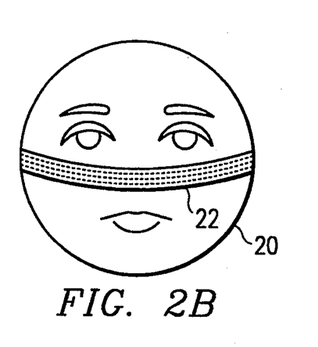
Figure 3A:
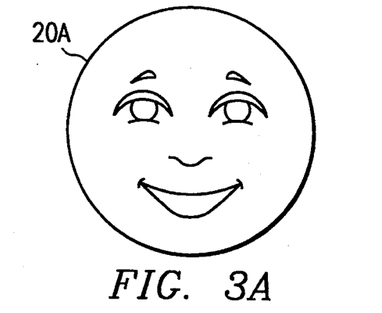
FIGS. 3a through 3h are views of various facial expressions of the face elements in the preferred embodiment of the invention.
Figure 3B:
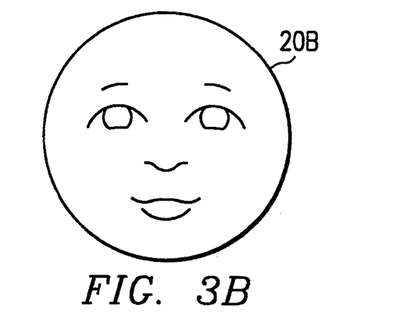
Figure 3C:
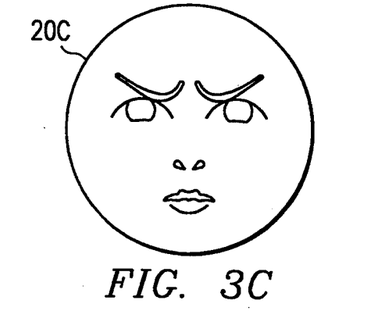
Figure 3D:
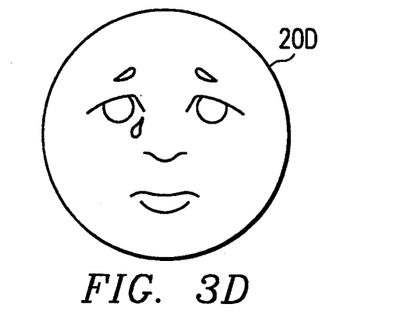
Figure 3E:
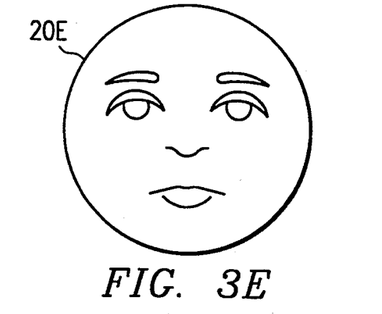
Figure 3F:
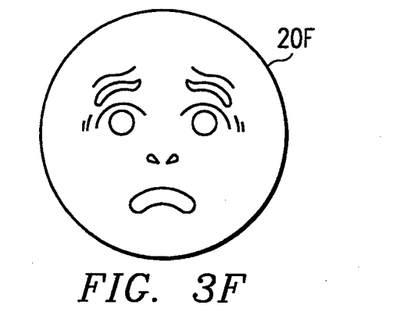
Figure 3G:
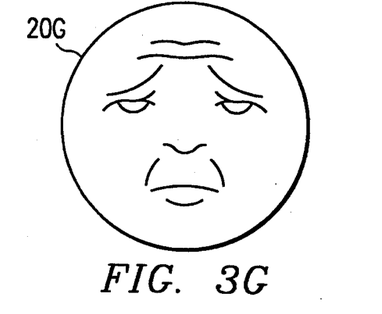
Figure 3H:
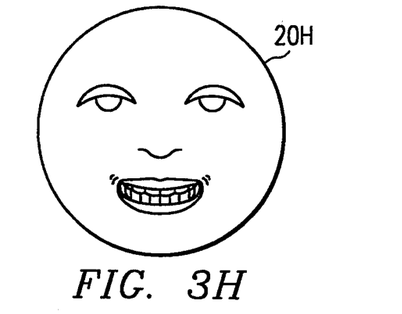

Referring now to FIGS. 2a and 2b, the construction of face element 20 for attachment to doll 2 by a patient will now be described in detail. As shown in FIG. 2a, face element 20 is a cloth disk, preferably fabricated of the same fabric as doll 2 and loosely stuffed so as to be soft. A facial expression is fixably printed on face element 20 as shown in FIG. 2a to indicate an emotional state or "feeling", which in this example is sadness. Elastic band 22 is sewn to the side edges of face element 20, and is of the appropriate length and resiliency to secure face element 20 over head portion 4 of doll 2 when placed thereover by the patient. This construction facilitates rapid and repetitive installation and removal of face elements 20 by the patient.

As shown in FIG. 2b, face element 20 may optionally have another facial expression printed on its reverse side. The reverse printing of face element 20 allows the expression of other emotional conditions without requiring a large number of face elements. Since elastic band 22 is attached to the side edges of face element 20, display of the reverse facial expression on doll 2 may be effected merely by flipping elastic band 22 to the other side of face element 20, prior to placing face element 20 over head portion 4.

The construction of face elements 20 according to this embodiment of the invention provides the advantages that multiple face elements 20 may be placed over head portion 4 of doll 2 at the same time to convey that certain emotional states or attitudes are being hidden. For example, the patient can express internal sadness hidden by a happy facade by placing a face element 20 with a sad expression under a face element 20 with a happy expression. Other combinations of face elements 20 are also enabled by the construction of this embodiment of the invention.

Referring now to FIGS. 3a through 3h, a set of face elements 20 having varying facial expressions will now be described. Face elements 20 illustrated in FIGS. 3a through 3h may comprise a set of face elements 20 stored in backpack 14; of course, other face elements 20 may be included in such a set, as well as blank face elements 20 upon which the patient may draw a particular facial expression. The emotions conveyed by the examples of face elements 20 shown in FIGS. 3a through 3h are as follows:

| Face element | Emotional state |
|---|---|
| 20a | happy |
| 20b | content |
| 20c | angry |
| 20d | sad |
| 20e | emotionless |
| 20f | frightened |
| 20g | ashamed or guilty |
| 20h | falsely happy |

In the event that pairs of expressions of FIGS. 3a through 3h are implemented on opposing sides of the same face element 20, care should be used in the assignment of these pairs so that the patient is not limited in his ability to convey the masking of one emotion with another, as described above.

Face elements 20a through 20h are, of course, described hereinabove by way of example only. It is contemplated that additional face elements 20 with other facial expressions, facial expressions in combination with words, or the like may be substituted for or provided in addition to those illustrated in FIGS. 3a through 3h. It is further contemplated that face elements 20 having ethnic indicators, or other features bearing a resemblance to a particular patient, may also be provided in prescribing doll 2 for a patient.

Figure 4:
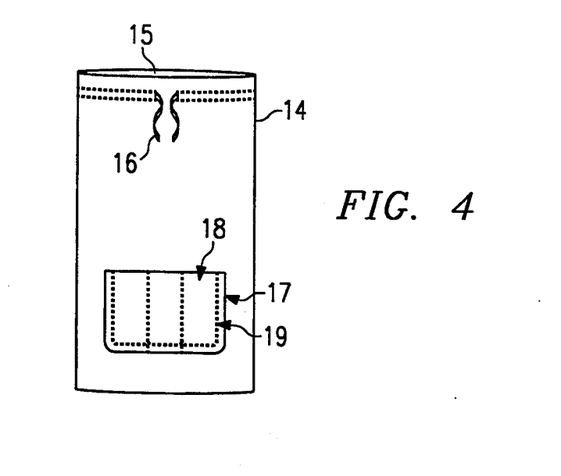
FIG. 4 is an elevation view of a backpack useful in the preferred embodiment of the invention.

Referring now to FIG. 4, the construction of backpack 14 will now be described in detail. As noted above relative to FIG. 1b, backpack 14 may be sewn onto body portion 10 of doll 2. Alternatively, backpack 14 may be removably attached thereto (e.g., by way of straps), to facilitate cleaning of doll 2 and backpack 14. In this example, drawstring 16 is provided near top opening 15 so that the contents of backpack 14, such as the set of face elements 20 described hereinabove, may be secured therewithin. Supportive printed material may also be stored and carried within backpack 14, such as a listing of positive principles for patients to read and use in the nature of affirmations during therapy, hospitalization, or outside of therapy at home. Other supportive reading material may also be stored within backpack 14, as desired. In addition, the patient may wish to store important memorabilia from her past in backpack 14 to facilitate accurate recollection of her prior emotional conditions.

In addition, also as noted above, multiple transparent pockets 18 are provided on the back of backpack 14. In this example, sheet 17 of transparent plastic is sewn onto backpack 14 by stitching pattern 19 arranged to provide three pockets 18 with openings at the top. Pockets 18 are provided so that the patient can express certain attributes about doll 2 during a therapy session. For example, the patient can insert a card into one of pockets 18 upon which he has written the age to which the current facial expression on doll 2 corresponds. The provision of multiple pockets 18 also provides the patient the ability to insert cards upon which he has written ages and emotional conditions, so as to visually express an emotional history.

Figure 5:
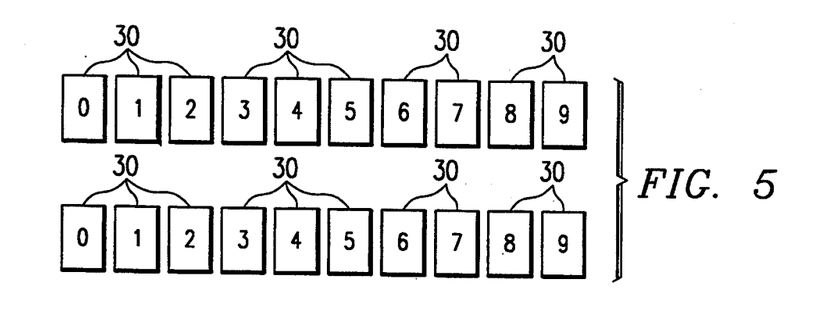
FIG. 5 illustrate a set of age-basis indicia cards for insertion into and display by pockets on the backpack of FIG. 4.

FIG. 5 illustrates a set of cards 30 which may be inserted into pockets 18 for use as age basis cards displayable therein. In this example, the set includes duplicate cards 30, each having a digit printed thereon, such that any age from 0 to 99 may be displayed in pockets 18 of backpack 14 by the insertion of cards 30 thereinto. Of course, blank cards may also be provided so that the patient may print or write an age-based indicator thereon, including a range of ages, or a written description of the time of life for which the self-image is being projected onto doll 2 (e.g., "childhood", "infancy", etc.), or units of time (e.g., "yrs. ago").

In addition to or instead of age-based indicators, other items such as photographs, patient-created drawings or text, identification cards (useful in an in-patient hospital setting), and the like may be displayed in pockets 18.

A carrying bag (not shown) may be provided within which doll 2, face elements 20 and various printed material may be stored between therapy sessions and transported thereto. Additional identification information, including hospital logos and the like, may be displayed on the carrying bag, instead of on doll 2, so that doll 2 can remain substantially featureless and ambiguous, as described hereinabove, while still providing a location for the display of marketing information for the hospital, the therapist, or other organizations.

Doll 2 according to the preferred embodiment of the invention is contemplated to be extremely useful in psychotherapy, particularly in such therapeutic contexts where expression of current and historical emotional conditions is important. In particular, it is contemplated that the patient will be able to more readily manifest expressions of emotional conditions by applying face elements 20 to doll 2 according to the present invention, in combination with the insertion of age-basis cards into pockets 18 of backpack 14. The patient is thus enabled to progress from general expressions of emotional states to specifics, such progress being beneficial according to many psychotherapeutic procedures.

An example of a method of psychotherapy which is contemplated to especially benefit from the present invention is that where the patient is asked about important times in her life, such as during childhood or adolescence. This type of emotional recollection has been referred to as focusing on "the inner child" or on "the child within", as discussed hereinabove in the Background of the Invention. The therapist provides doll 2 according to the present embodiment of the invention to the patient, and encourages the patient to attach arms 8 and legs 12 around herself so that she faces doll 2 and feels intimate therewith. The therapist then instructs or allows the patient to express her emotional condition at a particular age, or at any age she may select, by attaching one (or more) of the set of face elements 20 over head portion 4 to project onto doll 2 a self-image corresponding to the selected age. Preferably, the patient also inserts a card or other age-based indicia into one of the pockets 18 of backpack 14, to allow the therapist to view the age of the self-image currently being expressed. Multiple pockets 18 allow the patient to convey a history of self-images to the therapist, indicating growth, regression or defense mechanisms undertaken by the patient as her recollections proceed from the past to the present, or vice versa. In addition, the multiple pockets provided in backpack 14 also can allow the patient to express that the same emotional condition was experienced at multiple ages; for example, frightened face element 20f may be displayed over head portion 4 in combination with age-based indicia cards for ages 5, 8 and "one year ago" displayed in backpack 14.

Doll 2 according to this embodiment of the invention is therefore contemplated to be especially useful in the individual psychotherapeutic process, particularly for adults. The construction of doll 2 described hereinabove, which is faceless, as well as substantially featureless and colorless, provides the patient with substantially a "blank slate" upon which to express and project his current emotional state, or emotional states in his past, without barriers presented by the representational or ornamental bias in conventional psychotherapeutic dolls and other tools having representational features, faces, colors and the like. At most, doll 2 according to this invention includes suggestion of its gender (e.g., bow tie 9 and collar 11); these gender indicia are also preferably removable, to allow the patient to express his emotions concerning gender ambiguity or role confusion. As a result, the patient is able to utilize doll 2 to perform free association in order to express, and project onto doll 2, his emotional states, attitudes, defensive processes, and other attributes corresponding to a self-image at a certain age, including those emotions which, due to a psychological or physiological reason, are otherwise difficult to express. For example, doll 2 is useful for mute patients, and for those patients that may have difficulty expressing deeply troubling emotional history, such as a history of physical or sexual abuse. In addition, doll 2 enables the communication of emotional self-images between a patient and a therapist who do not speak a common language. Blind patients may be provided with doll 2 in combination with braille indicators, raised patterns on face elements 20 and the like. Furthermore, group therapy for blind patients is enabled by doll 2 having raised indicators, particularly in allowing the patients to communicate emotional conditions to other blind patients by allowing them to feel the raised indicators, thus reducing the need for verbal communication or touching of patients' faces, which may be uncomfortable relative to certain emotional conditions.

It is contemplated that each doll 2 will be permanently assigned to an individual patient, by way of prescription or gift. Permanent assignment of doll 2, considering its substantially colorless fabric, allows the patient to draw images onto doll 2 to indicate his own identity, and to become more familiar and comfortable with doll 2, further facilitating the expression of various self-images. It is contemplated that the patient will so closely identify with doll 2, by projecting thoughts, fantasies, preferences and self-images thereon, that he will become "territorial" about doll 2 permanently assigned to him. It is further contemplated that additional attachments may be useful with doll 2, such as multiple, individually removable, fabric layers representative of body fat that are attachable to body portion 10 by way of VELCRO type fasteners, elastic, or other means, for indicating current or past self-images.

Doll 2 according to the present invention may also be permanently assigned to patients with eating disorders, to facilitate their permanent or temporary self-expression.

Alternatively to the permanent assignment of a doll 2 to a patient, the psychotherapist may retain a doll 2 according to the preferred embodiment of the invention for use by multiple patients, for example as a communicative tool during initial diagnostic interviews. In this use, the patients will generally be prevented from drawing or otherwise permanently marking doll 2 to avoid creation of representational bias to subsequent patients.

Figure 6:
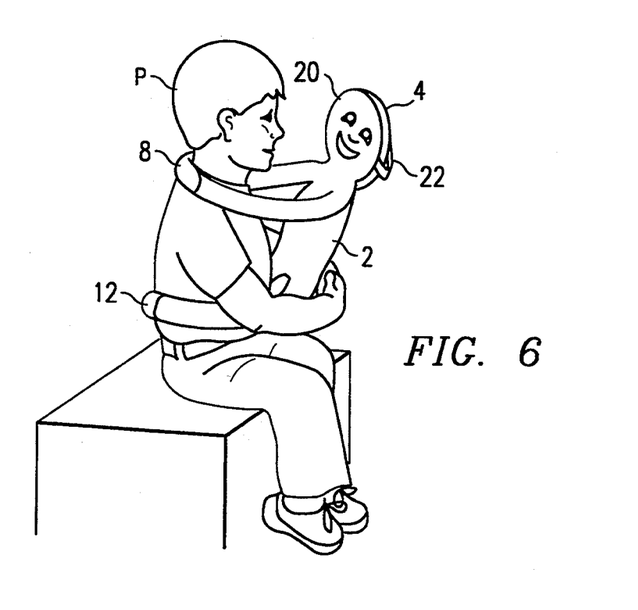
FIG. 6 is a perspective view of a doll according to the preferred embodiment of the invention in use in a psychotherapeutic setting.

In addition, the construction of doll 2 with disproportionately long arms 8 and legs 12 provides the patient with a comforting object during therapy sessions. Referring to FIG. 6, a patient is illustrated as utilizing doll 2 to express an emotion. As illustrated in FIG. 6, arms 8 and legs 12 are wrapped around patient P in a hugging manner, and fastened by way of VELCRO type fasteners. The combination of hugging arms 8 and legs 12 with the soft feel of body portion 10 enables the patient to become intimate with and identify with doll 2, and thus to accurately and easily use doll 2 to express an emotional condition either currently experienced or recalled from the past.

The ability of face elements 20 in this embodiment of the invention to overlay one another allows the patient to openly express certain emotions while concealing others, corresponding to the present time as well as to particular earlier ages. The provision of multiple pockets 18 on backpack 14 also facilitates the expression of overt-feeling states as well as covert-feeling states relative to the patient's present self-image or to prior self-images.

In the group therapy context, face element 20 may preferably be displayed so that the projected emotion faces outwardly from patient P, rather than toward patient P as shown in FIG. 6; this allows others in the group to readily view the projected emotion. A "hidden" feeling may then be projected by a second face element 20 placed over head portion 4 so as to face patient P, in the manner shown in FIG. 6, so that the others in the group cannot view the hidden or repressed emotional condition.

Upon the patient expressing a particular self-image, the therapist can record an accurate projection of the emotional state of the patient at a given time. The therapist can then question the patient according to conventional psychotherapeutic techniques, receiving responses either verbally or by way of doll 2 (or both), both in the diagnostic procedure or in providing therapeutic counseling.

While doll 2 according to the present invention is especially beneficial in allowing expression of emotional historic events and conditions, it is contemplated that doll 2 according to the preferred embodiment of the invention will also be useful to assist non-verbal patients to express current emotional conditions. In particular, patients that are frightened or apprehensive, or those patients who are generally non-verbal in nature (including mute patients) or who have regressed to non-verbal communication, may use doll 2 according to the preferred embodiment of the invention. As noted above, raised expressions on face elements 20 and braille age-based indicators on cards 30 may be provided, so that blind patients may also utilize and benefit from the present invention both in individual and group therapy contexts.

In addition to individual therapy, doll 2 according to the preferred embodiment of the invention is also contemplated to be useful in a group therapy context, as the group setting may be quite inhibiting for free verbal communication of emotional conditions or history. Doll 2 according to the preferred embodiment of the invention provides a friendly non-verbal medium for such expression, especially the expression of troubling emotional states. It is also contemplated that several patients may use their dolls 2 in relation to one another during group therapy. For example, a codependency situation may be expressed by two patients linking the VELCRO fasteners 6A, 6B for their dolls 2 together, in effect "holding hands"; other properties, such as a ball and chain, may be used in this combination to expand upon the expression of the codependent situation.

The above description is given relative to adult patients, including geriatric patients. It is also contemplated that children and adolescents may facilitate their therapy by use of doll 2 according to the preferred embodiment of the invention, particularly in expressing emotions felt as a result of a traumatic situation, such as an abuse event.

Furthermore, doll 2 according to the preferred embodiment of the invention is also contemplated to be useful for children (as well as adults) who suffer from learning disabilities, particularly in interactive sessions with teachers or tutors. Doll 2 according to the preferred embodiment of the invention may also prove useful in workshops, retreats, and other events promoting self-awareness, outside of the traditional therapy context.

While the invention has been described herein relative to its preferred embodiment, it is of course contemplated that modifications of, and alternatives to, this embodiment, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

What is claimed is:

1. A method of providing therapy to a person, comprising:
   providing the person with a doll, said doll being substantially free of expression and ornamentation and comprising:
   a body portion;
   a pair of arms extending from said body portion, said arms disproportionately long relative to the shape of a human;
   a pair of legs extending from said body portion, said legs disproportionately long relative to the shape of a human;
   a faceless head portion connected to said body portion;
   a plurality of face elements, each of said plurality of face elements having a facial expression thereon, and each of said face elements having an elastic band attached on side edges thereof to secure the same to the head portion of said doll; and
   a transparent pocket;
   instructing the person to project an emotional state onto the doll, by attaching a first one of said plurality of face elements onto the head portion, where the emotional state corresponds to a particular time in the life of the person; and
   instructing the person to insert, into the transparent pocket, indicia of the time in the life of the person corresponding to the emotional state projected on the doll.

2. The method of claim 1, further comprising:
   securing the doll to the person by connecting the distal ends of the arms to one another around the body of the person in a hugging fashion.

3. The method of claim 2, further comprising:
   securing the doll to the person by connecting the distal ends of the legs to one another around the body of the person in a hugging fashion.

4. The method of claim 1, wherein the doll further comprises a backpack attached to the back of the body portion of the doll, said transparent pocket being disposed on said backpack.

5. The method of claim 1, wherein the person is an adult;
   and wherein the time in the life of the person corresponding to the emotional state projected on the doll is childhood.

6. The method of claim 1, further comprising:
   instructing the person to draw indicia of the emotional state onto one of said plurality of face elements.

7. The method of claim 1, wherein the therapy setting is group therapy.

8. The method of claim 1, wherein the therapy setting is individual therapy.

9. A method of providing therapy to a person, comprising:
   providing the person with a doll, said doll being substantially free of expression and ornamentation and comprising:
   a body portion;
   a pair of arms extending from said body portion, said arms disproportionately long relative to the shape of a human;
   a pair of legs extending from said body portion, said legs disproportionately long relative to the shape of a human;
   a faceless head portion connected to said body portion;

a plurality of face elements, each of said plurality of face elements having a facial expression thereon, and each of said face elements having an elastic band attached on side edges thereof to secure the same to the head portion of said doll; and a plurality of transparent pockets, each for receiving a card;

instructing the person to project an emotional state onto the doll, by attaching a first one of said plurality of face elements onto the head portion, where the emotional state corresponds to a particular time in the life of the person; and instructing the person to insert, into the transparent pockets, indicia of the times in the life of the person corresponding to the emotional state projected on the doll, to provide an emotional history.

10. A method of providing therapy to a person, comprising:

providing the person with a doll, said doll being substantially free of expression and ornamentation and comprising:

a body portion;

a pair of arms extending from said body portion, said arms disproportionately long relative to the shape of a human;

a pair of legs extending from said body portion, said legs disproportionately long relative to the shape of a human;

a faceless head portion connected to said body portion; and a plurality of face elements, each of said plurality of face elements having a facial expression thereon, and each of said face elements having an elastic band attached on side edges thereof to secure the same to the head portion of said doll;

instructing the person to project an emotional state onto the doll, by attaching a first one of said plurality of face elements onto the head portion, where the emotional state corresponds to a particular time in the life of the person; and instructing the person to convey hidden feelings by attaching a second one of said plurality of face elements onto the head portion over the first one of said plurality of face elements, to hide the expression presented by the first one of said plurality of face elements.

11. The method of claim 10, further comprising:
securing the doll to the person by connecting the distal ends of the arms to one another around the body of the person in a hugging fashion.

12. The method of claim 11, further comprising:
securing the doll to the person by connecting the distal ends of the legs to one another around the body of the person in a hugging fashion.

13. The method of claim 10, further comprising:
instructing the person to draw indicia of the emotional state onto one of said plurality of face elements.

* * * * *